United States Patent [19]

Kantner

[11] Patent Number: 4,887,826

[45] Date of Patent: Dec. 19, 1989

[54] LIGHTWEIGHT FOLDABLE WHEELCHAIR

[76] Inventor: Richard D. Kantner, 6430 Campina Pl., La Jolla, Calif. 92037

[21] Appl. No.: 204,716

[22] Filed: Jun. 10, 1988

[51] Int. Cl.[4] ............................................ B62M 1/1 4

[52] U.S. Cl. ................................ 280/250.1; 280/650; 280/657; 280/62; 280/278; 297/53; 297/378; 297/436

[58] Field of Search ............... 280/242 WC, 657, 647, 280/641, 642, 62, 278, 279, 250.1, 650; 297/378, 433, 436, DIG. 4, 30, 51, 53, 54, 354

[56] References Cited

U.S. PATENT DOCUMENTS

| | | | |
|---|---|---|---|
| 3,007,737 | 11/1961 | Lichter | 297/378 |
| 3,594,039 | 7/1971 | Harp | 297/378 |
| 3,679,257 | 7/1972 | Jacuzzi et al. | 297/433 X |
| 4,101,143 | 7/1978 | Sieber | 280/42 |
| 4,103,922 | 8/1978 | Brilando | 280/279 |
| 4,273,350 | 6/1981 | Williams | 280/242 WC |
| 4,392,690 | 7/1983 | Anderson | 280/242 WC |
| 4,474,385 | 10/1984 | Costello et al. | 280/242 WC |
| 4,483,653 | 11/1984 | Waite | 414/541 |
| 4,592,570 | 6/1986 | Nassiri | 280/650 |
| 4,650,201 | 3/1987 | Hartwell | 280/242 WC |
| 4,678,202 | 7/1987 | Jensen et al. | 297/DIG. 4 X |
| 4,679,816 | 7/1987 | Riikonen | 280/650 |
| 4,684,149 | 8/1987 | Meyer | 280/650 |
| 4,684,171 | 8/1987 | Roy et al. | 297/47 |
| 4,763,911 | 8/1988 | Gebhard et al. | 280/642 X |

FOREIGN PATENT DOCUMENTS

| | | | |
|---|---|---|---|
| 2548096 | 1/1985 | France | 280/242 WC |

OTHER PUBLICATIONS

W. G. Stamp et al., *Wheelchair Mobility,* University of Virginia, Rehabilitation Engr. Center (1985), pp. 92-95.

Equalizer Corp., *Operations Manual for the Equalizer T2,* (1981), pp. 1-9.

*Primary Examiner*—Charles A. Marmor

*Assistant Examiner*—Tamara L. Finlay

*Attorney, Agent, or Firm*—Brown, Martin, Haller & McClain

[57] ABSTRACT

A lightweight foldable wheelchair is provided which comprises a seat having a base and a back hingedly attached to the base, the back being foldable to overlie the seat base; a pair of large wheels each demountably attached to the end of an axle at the bottom rear of the seat base and rearward of the center of gravity of the chair; a first strut having its rearward end hingedly mounted to the underside forward portion of the seat base of the seat; and a second strut having its rearward end hingedly mounted to the underside of the seat base of the seat rearwardly of the first strut and forward of the wheel axle, the forward ends of both struts abutting below and forward of the seat and securing a demountable caster wheel and hingedly mounted footrest, and the struts being foldable to underlie the seat. The wheelchair can therefore be folded into a compact configuration when the wheels are demounted. The chair is formed of lightweight materials such as carbon fiber composites and has a total weight substantially less than that of typical prior art "lightweight" or "ultralight" wheelchairs.

21 Claims, 3 Drawing Sheets

LIGHTWEIGHT FOLDABLE WHEELCHAIR

FIELD OF INVENTION

This invention relates generally to wheelchairs and more particularly to lightweight, foldable and portable wheelchairs.

BACKGROUND OF THE INVENTION

The different needs and requirements of wheelchair users have resulted in a variety of styles and types of wheelchairs. Most existing designs of wheelchairs can be viewed as derivations from the traditional institutional wheelchair, which can be characterized by rugged construction designed to provide maximum stability to the user. Based on this primary design consideration, extensive use of heavy gauge metal, such as steel or aluminum, for members or components is common in wheelchair designs, resulting in very stable and sturdy wheelchairs, but at the expense of weight and easy portability.

There are lightweight wheelchairs for racing, basketball and other sports events. Although designed for lightness, impact resistance and maneuverability, they are not comfortable to use for more than very limited periods because the design for maximizing power or energy of the user adversely affects the sitting position of the user.

Some wheelchairs are foldable so that they can be stowed when not in use. It is important to have the foldable wheelchair as compact as possible when in a folded state. In many wheelchairs, the folded state is quite large because the wheels and wheel hubs extend outwardly, adding to the width of the wheelchair, even in its folded state. Further, if the wheels remain on the wheelchair in its folded state, the wheels themselves add to the difficulty in positioning the wheelchair in a compact space, such as the trunk or rear seat portion of a car. Examples of such foldable wheelchairs are found in U.S. Pat. Nos. 4,101,143 and 4,273,350 which describe designs foldable inwardly toward the medial plane of the wheelchair. Despite such folding capability to reduce the width of the wheelchairs, the overall heights of the wheelchairs remain the same, making the wheelchair bulky and difficult to handle.

There are some foldable wheelchairs having detachable wheels. For example, U.S. Pat. No. 4,650,201 describes a lightweight wheelchair having detachable wheels and a back support for the seat which is forwardly foldable. However, this design employs numerous linkages and strut supporting members which are not foldable. Thus, in its folded state, the wheelchair structure remains bulky and awkward to handle.

There has also been at least one foldable lightweight wheelchair advertised to the market. That chair was designed with the caster essentially under the chair seat and the caster supports mounted such that the chair was a "center of gravity" chair. Such chairs are known to be quite unstable and have a definite tendency for the user to tip backward and overturn the chair. Such chairs require special operating techniques for the user, and the user must become trained to maneuver the chair without tipping it over. Many persons have physical conditions which do not permit them to use such a chair, whether or not the chair is foldable.

There is consequently a need for an improved wheelchair which combines stability and maneuverability, as found in "sports" models, with exceptional lightness and comfort. There is also a need for a wheelchair in which strength and resilience are present with minimum structure, as well as a need for a wheelchair which is both conveniently portable and adaptable to easy storage.

SUMMARY OF THE INVENTION

Accordingly, this invention provides a lightweight foldable wheelchair comprising a seat having a base and a back hingedly attached to the base for forward folding; a pair of large wheels each demountably attached to an end of an axle member mounted at the rear portion of the base of the seat and to the rear of the center of gravity of the chair; a first strut having its rearward end hingedly mounted to the underside forward portion of the base of the seat; and a second strut having its rearward end hingedly mounted to the underside of the base of the seat rearwardly of the first strut and forward of the axle member, the forward ends of the struts abutting below and forward of the seat and securing a demountable wheeled caster and a hingedly mounted footrest.

The preferred embodiments of the invention incorporate a number of features. The seat can be contoured to conform to the human body. The base of the seat can have upraised edges on its rear and side portions to provide additional body support. The axle is attached directly to or disposed through or incorporated into the seat base for a pair of drive wheels on either side of the wheelchair. These wheels contain quick release mechanisms for detachment from the chair. A pair of struts are hingedly attached to and extend from the seat base forwardly to provide frontal support for the wheelchair. The strut members are connected at a point where a caster wheel for directional turning is detachably engaged through a quick release mechanism. A footrest having adjustable length and heel supports is hingedly attached to one of the strut members. In the retracted configuration, the caster wheel can be removed from the frontal support strut members using the quick release mechanism. The footrest and the strut members are then folded rearwardly to stow under the seat base, forming a lightweight compact unit.

DETAILED DESCRIPTION AND PREFERRED EMBODIMENTS

Figure 1:
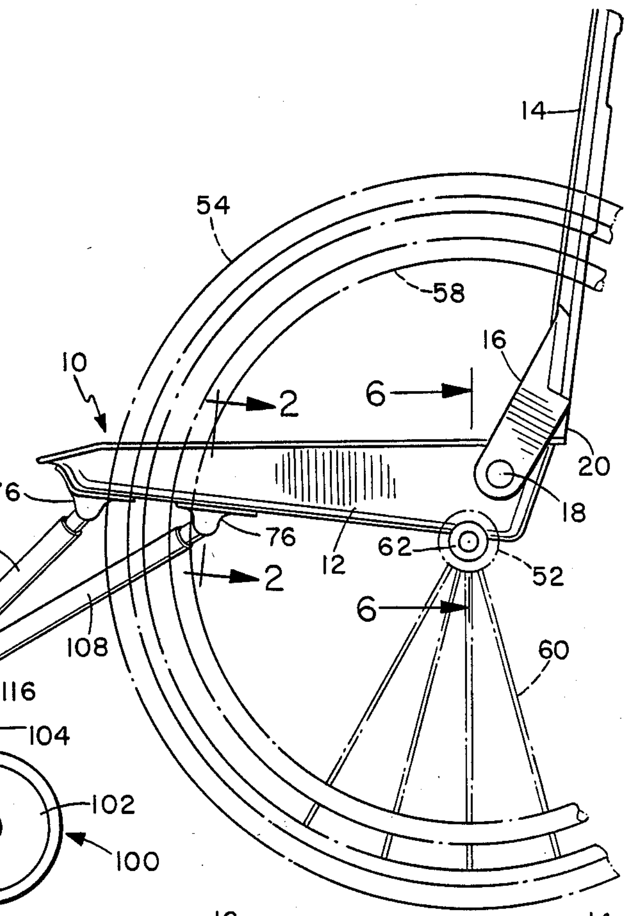
FIG. 1 is the side elevation view of the wheelchair.

As shown in FIG. 1, the wheelchair of the present invention includes a lightweight seat 10 having a base 12 and a back 14. Wheels are provided for movement of the chair. In a preferred embodiment, there are two large rear drive wheels and a small front wheeled caster. As used in the descriptions below, the orientation and location of the various parts and elements correspond to the orientation of a person seated in the chair.

In the embodiment illustrated, the wheelchair of the invention has a back 14 and base 12 joined together through a pair of brackets 16 on either side of back 14, each of which is journaled on a pivot pin 18 attached to base 12 to form a hinged joint so that back 14 can be folded forwardly to overlie base 12. In its upright position, back 14 is supported by stop 20 at its lower portion acting against the rear portion of base 12. Preferably the seat back and base will be disposed at an angle to each other that approximates the angle of ordinary chairs. If the back and seat base are at a low angle to each other, the chair will tend to be unstable and it will be difficult for the user to maneuver it.

For the comfort of its occupant, the seat 10 is preferably contoured to conform to the shape of the human body. Cushions or upholstery for base 12 and back 14 can be provided where desired. Both the side edges and the rear portion of base 12 have upraised portions to enhance stability of the occupant in the sitting position and to reduce lateral movement of the user relative to the seat of the wheelchair.

Figure 6:
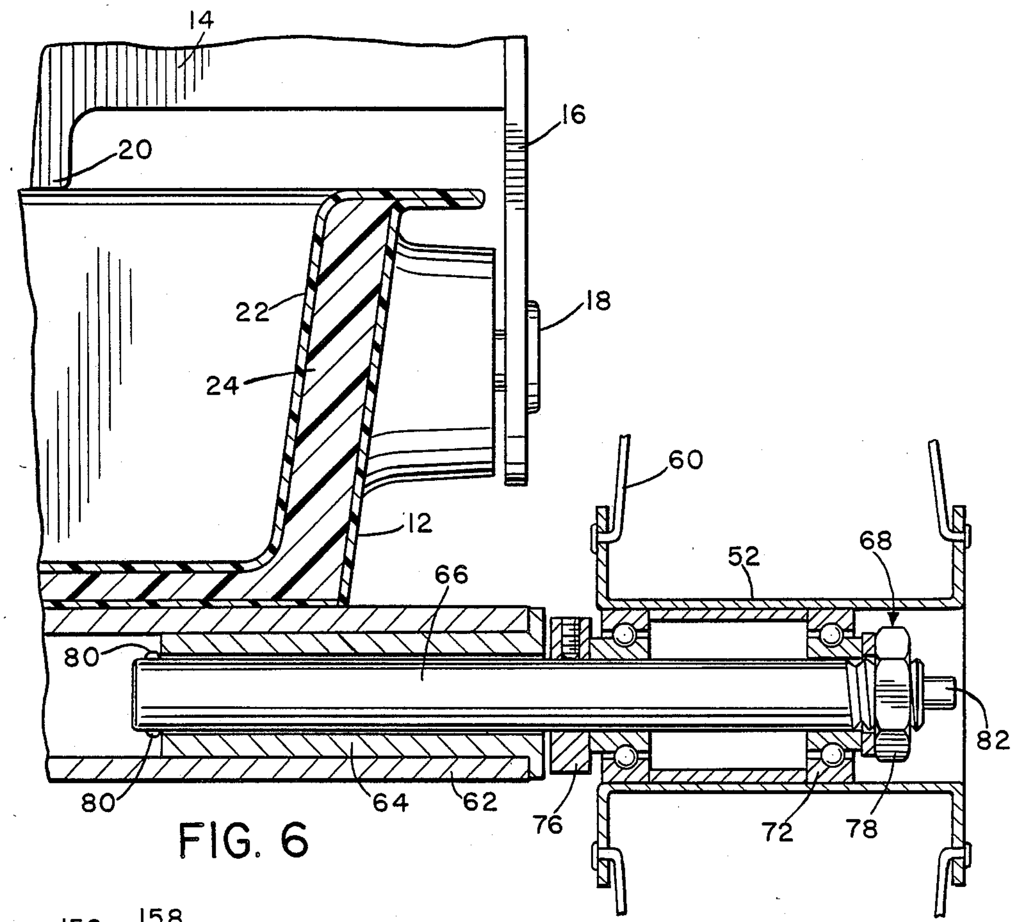
FIG. 6 is an enlarged sectional view taken on line 6—6 of FIG. 1.

Base 12 and back 14 are preferably each of one-piece construction. While there can be many variations in the choice of materials for and the fabrication of base 12 and back 14 of the seat 10, it is desirable to have a design which minimizes weight and at the same time provides good structural strength and stiffness for the wheelchair. In the preferred embodiment, base 12 and back 14 are each formed of a sandwich or composite structure having a core 24 and a facing or skin 22, as illustrated in FIG. 6. Core 24 is made of a material which contributes good stiffness characteristics. Such material can be one of the many rigid plastic materials, such as polyurethane. The core preferably has a honeycomb or foam structure for lightness and strength. In fabrication, material for core 24 is first molded, cut or milled to form the shapes of base 12 and back 14. Where an expansive type of plastic foam material is used, a mold can be constructed to produce the shapes. One or more layers of material for the skin or facing 22 is then bonded onto core 24 to form a sandwich structure for seat base 12 or back 14. It is desirable that the material for facing 22 possess good strength; examples of suitable materials are aramid, carbon or graphite filaments or glass fiber, or combinations thereof, formed as composites with polymers. The method of bonding should be chosen so as to ensure strong adhesion between the core material and the facing. In a preferred embodiment, this is achieved by the use of suitable bonding agents or adhesives between the core and the skin materials, followed by curing the sandwich structure within a mold at elevated temperature, as known in the art. Thus, the combined sandwich structure of base 12 and back 14 has the attributes of being lightweight, stiff and strong. The molding process further ensures the desired overall shapes of base 12 and back 14.

Figure 3:
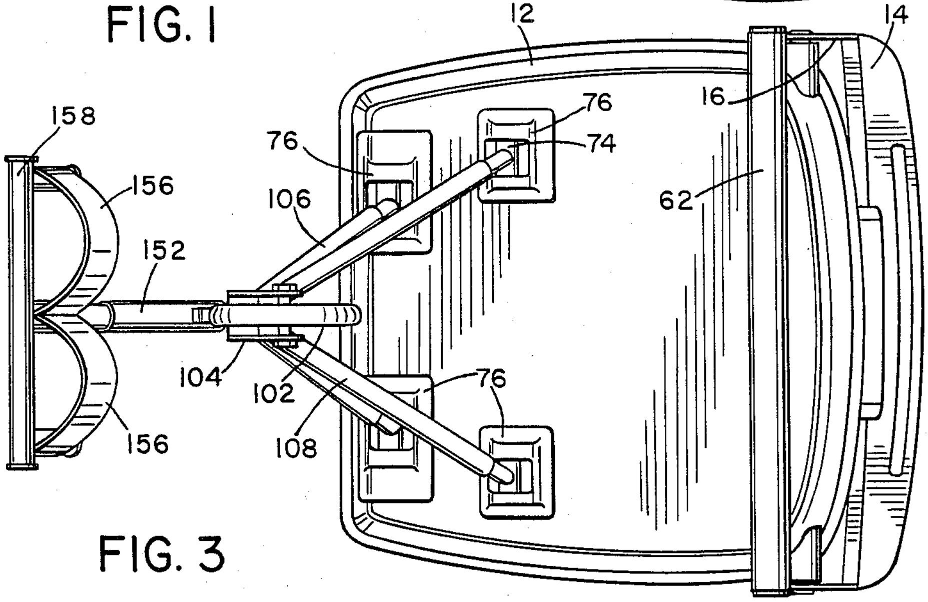
FIG. 3 is a bottom plan view of the wheel chair with the main wheels removed.

Underneath or in the lower part of base 12 is axle member or sleeve 62 for the two large drive wheels 54 and 56. Axle sleeve 62 extends slightly beyond the sides of base 12, as shown in FIGS. 3 and 6. Axle sleeve 62 is attached to or incorporated as part of seat base 12. The method of attachment or incorporation of axle sleeve 62 to base 12 can be by any conventional means, such as by adhesive bonding or by screws and metal brackets fastening axle sleeve 62 to base 12. In a preferred embodiment of the invention, axle sleeve 62 is incorporated directly into seat base 12 by being disposed beneath or in the core 24 which is then covered by facing material 22 and affixed to seat base 12 in conjunction with the molding of the seat base 12.

In the embodiment shown, axle member 62 is in the form of a sleeve and the wheel hubs are mounted into the hollow interior of the sleeve. Alternatively the axle member 62 could be a solid rod and the hubs could be mounted on the exterior thereof.

The position of axle sleeve 62 is chosen to provide increased wheelchair stability and compactness to enhance portability when the wheelchair is folded. Its location beneath base 12 is normally slightly rearward of the front-to-rear rotational center of gravity of the wheelchair when occupied. The rotational center of gravity, as used herein, is the point where the combined weight of the chair and occupant is balanced on the rear axle and the chair will rotate freely around the axle. Having the attachment located to the rear of the center of gravity shifts some weight to the front caster wheel but allows the user to easily pivot the chair about axle 62 when desired, such as for climbing a curb. The distance from the axle to the center of gravity must be sufficient to prevent the chair from easily tipping backward.

Axle sleeve 62 is preferably of a material that is both strong and light, such as carbon fiber composite tubing. A bushing 64 is provided within axle sleeve 62 to accommodate axle pin 66. Bushing 64 is formed of a lightweight bearing material having a hardness compatible with that of axle pin 66 and which will be free of corrosion to insure a smooth slip-fit of the axle assembly.

In the preferred embodiment as shown in FIG. 6, bushing 64 of the axle pin 66 is inserted into axle sleeve 62 and retained therein. Retention of bushing 64 can be by any method such as press-fit of bushing 64 into axle sleeve 62 or by adhesive bonding. Axle pin 66 is part of a quick release mechanism 68 mounted upon bearings 72 within wheel hub 52 for each of the two large main or rear drive wheels 54 and 56. Quick release mechanism 68 can be of any generally available types having spring-loaded retaining balls 80 which serve to retain axle pin 66 within bushing 64. By pressing push pin 82 against wheel bearing 72, retaining balls 80 will retract within axle pin 66 to permit removal of wheel hub 52 and therefore main drive wheels 54 and 56 from the wheelchair. The quick release mechanism 68 is retained within wheel bearing housing 72 by means of retaining collar 76 located between the wheel bearing 72 and bushing 64 and by hex nut 78 located on the opposite side or outboard end of bearing housing 72. The placement of quick release mechanism 68 within wheel bearing housing 72 of wheel hub 52 is such that the distance between retaining collar 76 and retaining balls 80 approximates the axial length of bushing 64 so they will act against both outer end lip portions of bushing 64 to minimize axial movement and wobbling of the main drive wheels. Thus, having established the axial length of bushing 64, retaining collar 76 is then affixed upon axle pin 66 through either a press-fit or by means of a set screw, followed by fastening hex nut 78 onto axle pin 66 to secure quick release mechanism 68 in place. The corresponding external quick release structure will be used when a rod-form axle member 62 is used instead of the illustrated sleeve-form axle member 62.

Figure 4:
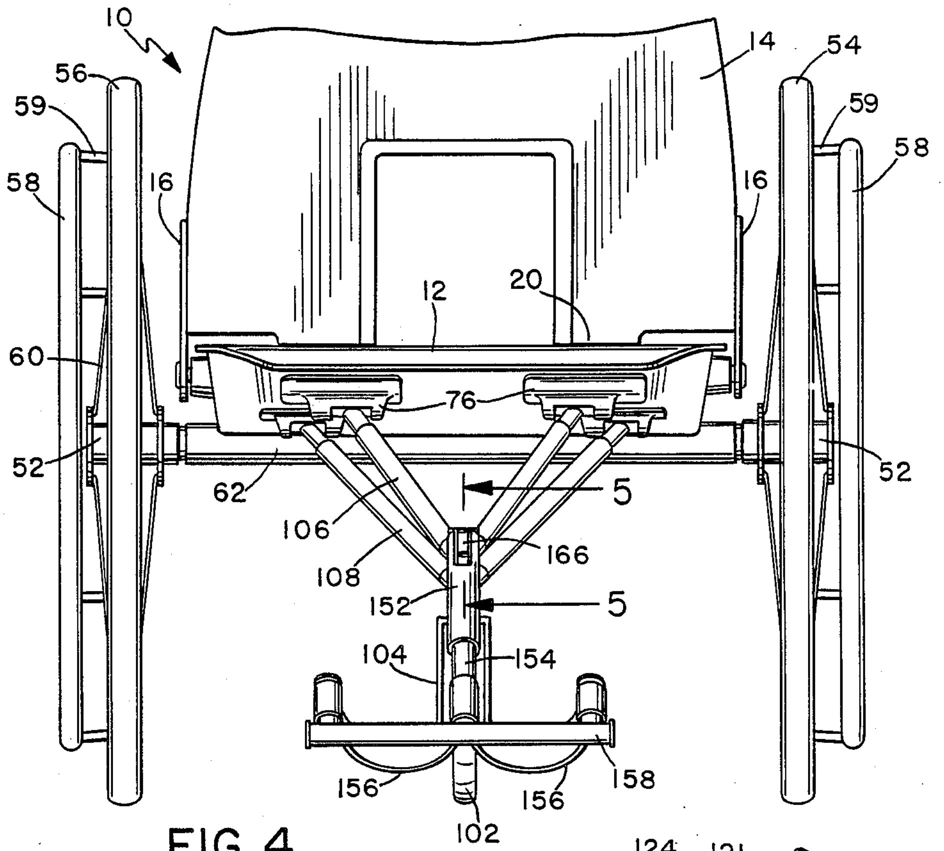
FIG. 4 is a front view of the wheelchair.

The large rear drive wheels 54 and 56 are detachably attached to axle sleeve 62 by means of quick release mechanism 68 described above. Drive wheels 54 and 56 as shown in FIGS. 1 and 4 can be of the conventional type used for wheelchairs. There are many variations of suitable drive wheels available and the choice of any particular type is not critical. In a preferred embodiment, as shown in FIG. 1, the main drive wheels are of the spoked wheel design. The spokes 60 transmit the weight of the wheelchair and its user to the rim. Attached to spokes 60 through posts 59 are hand rims or push rims 58 for the occupant to power the wheelchair. There can be a varied number of posts 59 to distribute the pushing force of the user over the entire wheel. The diameter of push rim 58 can also be varied (with corresponding relocation of the posts 59) to accommodate differing abilities or desires of user of the chair.

The frontal support for the wheelchair is provided by the caster wheel assembly 100 which comprises front wheel 102, wheel fork 104 and quick release mechanism assembly 105. The entire caster wheel assembly 100 is detachably attached to two pairs of front and back strut members 106 and 108. Each of the strut members 106 and 108 is hingedly connected to the underside of seat base 12 in relatively fore and aft locations. The attachment of the forward strut 106 will be at or near the front edge of the seat base 12 while that of the rearward strut 108 will be to the rear of the attachment point of strut 106 but forward of the axle member 62 in order to provide stability to the chair. In the preferred embodiment of the present invention, strut members are generally V-shaped, although single yoke members arranged in the fore and aft relative position for their attachment to the underside of seat base 12 can also be utilized to provide front end support to the wheelchair.

Figure 2:
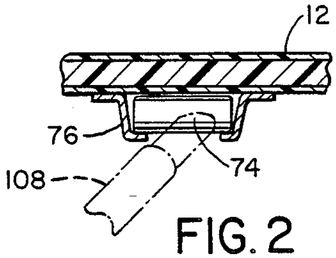
FIG. 2 is an enlarged sectional view of the wheelchair taken on line 2—2 of FIG. 1.

At the upper ends of each strut member are hinge pins 74 for placement within socket 76, as best shown in FIGS. 2 and 3. A hinge pin 74 is attached to each of the two end portions of front and back strut members 106 and 108 respectively and is retained by hinge sockets 76 mounted underneath seat base 12. The method of attachment of hinge pins 74 to the strut members 106 and 108 and the mounting of hinge socket 76 to seat base 12 can be by any conventional means such as by adhesives or by screws fastened to the bottom of seat base 12. If metal parts are used, welding may also be employed for such attachment or mounting. The particular choice of mounting is not critical to the present invention but should be obvious to one skilled in the art in accordance with sound design and engineering practice.

The hinged attachment within the hinge sockets permits strut members 106 and 108 to rotate freely toward the front or rear of the wheelchair. The size of front strut member 106 is smaller than that of strut member 108 to allow nesting of the former within the latter when they are rotated rearwardly to the retracted or stowed configuration underneath seat base 12. Conventional friction stops (not shown) are incorporated into the hinge sockets 76 to retain the folded chair in its compact configuration upon folding. In the deployed or extended position, the outward ends of strut members 106 and 108 align at a point along the medial plane in front of the wheelchair to establish a strong truss supporting structure. Ideally, the positioning of hinge sockets 76 for hinge pins 74 underneath seat base 12 for each of the strut members 106 and 108 is such that the axis of rotation for each strut members will be parallel so that when the strut members are extended in the extended configuration, both end portions of the strut members 106 and 108 will converge.

Figure 5:
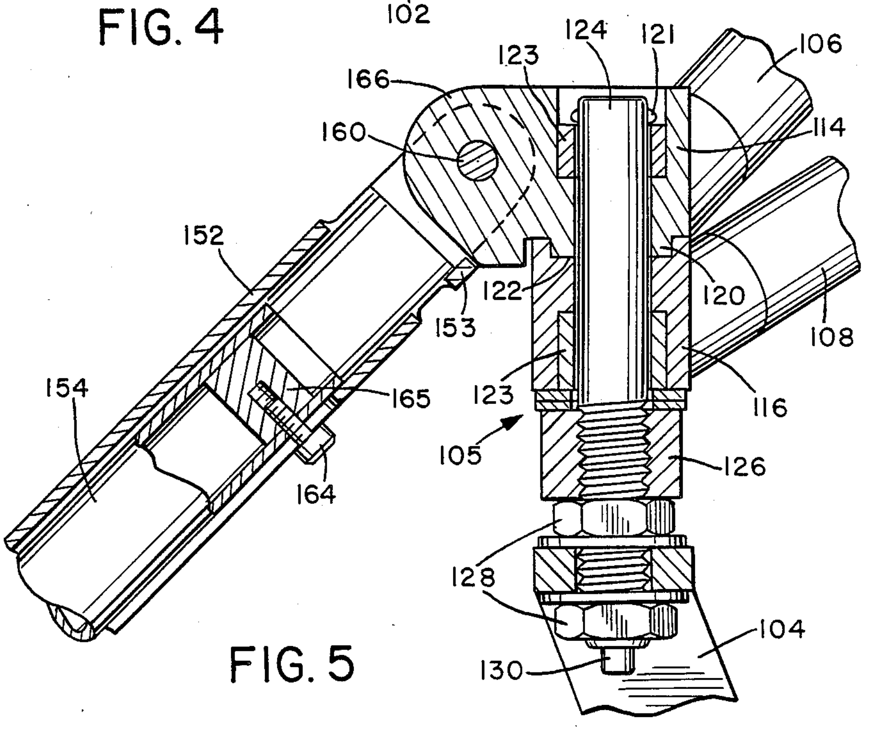
FIG. 5 is an enlarged sectional view taken on line 55 of FIG. 4.

In the extended configuration, strut members 106 and 108 are detachably coupled by cooperating engaging means affixed to each of their respective outward ends to establish a secured and rigid front end support for the wheelchair. FIG. 5 shows the preferred embodiment of these engaging means which are represented by upper and lower hubs 114 and 116 respectively for strut members 106 and 108. Hub 114 has an extended plug portion 120 at its lower portion for fitting within recess 122 located at the upper portion of lower hub 116 for strut member 108.

Hubs 114 and 116 each has an axial bore aligned for housing pin 124 of quick release mechanism 105 which is part of caster wheel assembly 100. In the preferred embodiment, each bore is defined by two portions having a respectively larger and smaller diameter. The portions having the larger diameter is to securably house bushing 123 for accommodating quick release pin 124 which is part of wheel assembly 100, as illustrated in FIG. 5. Bushing 123 has an outer diameter which is substantially the same as the larger diameter of hubs 114 and 116 so as to allow its placement therein by a slip fit. A set screw may be employed to secure bushings 123 in place if desired. Bushing 123 further has a smaller diameter which is in close tolerance with that of quick release pin 124 so as to provide a slip fit with the same. Bushing 123 is of a material having suitable hardness to withstand the stresses associated with the forces of the wheelchair operation. The portions of hubs 114 and 116 having the smaller diameter are of sufficient clearance in relation to the quick release pin 124 to minimize interference with its free movement therein.

Quick release pin 124 is part of the quick release mechanism 105 of caster wheel assembly 100. Quick release mechanism 105 may be of any the commercially available kinds. In a preferred embodiment of the present invention, quick release mechanism 105 contains spring-loaded retaining balls 121 which are pin-actuated by button 130 for releasably securing bushing 123 within upper hub 114.

As illustrated in FIGS. 1 and 5, wheel fork 104 of caster wheel assembly 100 is fastened to the lower portion of quick release mechanism 105 by means of retaining nuts 128. Caster wheel assembly 100 can be of any kind which is suitable for use on wheelchairs. The choice of any particular design is not critical to the present invention, and should be obvious to one skilled in the art. Preferably, wheel 102 is of lightweight construction, for example polyurethane. Wheel 102 is rotatably attached to wheel fork 104.

One caster wheel 102 is shown in the Figures. It will be evident, however, that two or more wheels can be used by mounting them in parallel alignment in a suitable bracket on wheel assembly 100. However, usually only one wheel is adequate, and therefore additional wheels only add to the chair's weight without improving performance. For this reason one wheel is the preferred configuration.

Caster wheel assembly 100 is releasably secured within hubs 114 and 116 of struts 106 and 108 respectively in their extended configuration. A spacer 126 is provided to support the lower hub 116 and to transmit the front end loading of the wheelchair to the caster wheel assembly 100. The length of spacer 126 is chosen to define the length of quick release pin 124 within the hubs 114 and 116 so as to limit the vertical movement of the caster wheel assembly 100 relative to hubs 114 and 116 as well as to ensure the mutual coupling of lower and upper hubs 114 and 116 in their extended configuration.

According to the present invention, a footrest 152 is provided which extends forwardly in a downward direction to support the occupant's feet. As illustrated in FIG. 5, footrest 152 is hingedly attached by hinge pin 160 to upper hub 114 at one end and is supported in its forward extended configuration by stop 153 acting against hinge lug 166. At the opposite end of footrest 152 is cross-bar member 158 extending outward on either side of and traverse to footrest 152. To further add foot support and comfort to the wheelchair occupant, a pair of heel supports 156 are provided which extend from either side of the front end portion of the footrest and connect in the middle to members 154 extending rearwardly from cross-bar 156.

Footrest 152 can be made of any light weight material, such as carbon fiber composite tubing or channels, as are used on the other strut members of the preferred embodiments of this invention. The length of footrest 152 should be suitably designed to accommodate the length of the occupant's feet. This design requirement is satisfied by having a footrest whose length is adjustable as illustrated by the preferred embodiment of the present invention depicted in FIG. 5. For example, footrest 152 comprises two tubular legs arranged in a telescopic relationship. The inner tubular leg 154 has a retaining lock screw 164 fastened to block 165 through an opening which allows it to slide along a slot along the longitudinal length of the outer tubular member. By sliding the inner and outer tubular legs relative to each other, the wheelchair occupant will be able to select a proper length to provide the most comfortable resting position for the feet. Once the proper length has been selected, the lock screw 164 is tightened to fix the length of footrest 152.

Figure 7:
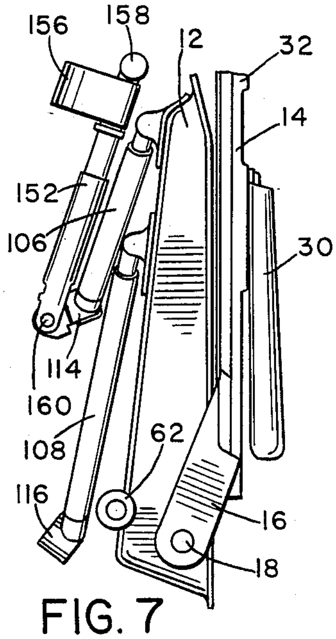
FIG. 7 is a side elevation view of the wheelchair in folded configuration with the wheels removed.
Figure 8:
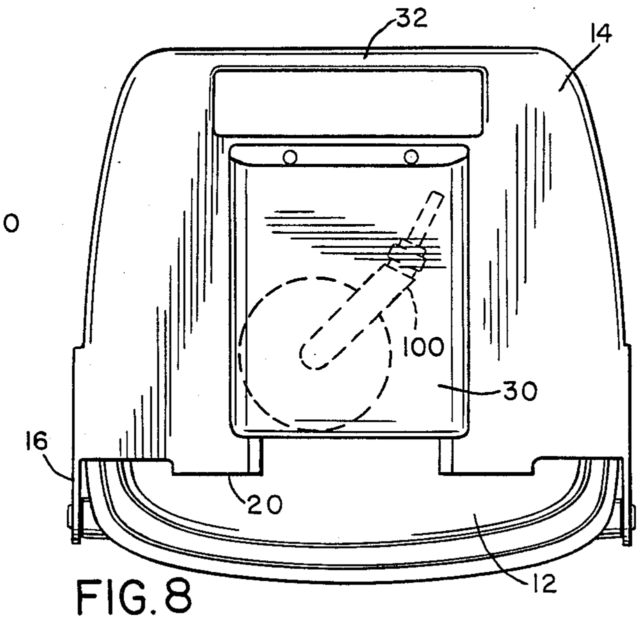
FIG. 8 is a top plan view of the folded wheelchair.

The wheelchair as described above is easily folded into a compact portable unit when not in use so that it can be stowed within a minimal amount of storage space, as shown in FIG. 7. The stowed configuration can be initiated by rotating footrest 152 about hinge connection 160 to its retracted position adjacent to front strut 106. The caster wheel assembly is then removed from the respective hubs of strut members 106 and !08 by pressing the quick release actuation pin 130. For storage, the caster wheel assembly 100 is provided with a pouch 30 attached to the back side of seat back 14. The two struts 106 and 108 are then disengaged from each other by the removal of plug 120 of hub 114 of strut 102 from socket 122 of hub 116 of strut 108. Thereafter, both struts may be rotated rearwardly in their respective retracted position under seat base 12 with strut 106 nesting within strut 108. Seat back 14 is folded forwardly so it may overlie seat base 12. To facilitate folding and for portability, an opening is made at the upper portion of back 14 so as to provide a gripping area 32. Fastening straps may also be provided to restrain the various moving parts in the stowed configuration. The main drive wheels are then demounted from axle sleeve 62 by pressing push pin 82 against wheel hub 52 whereupon retaining balls 80 of quick release mechanism 68 recede within axle pin 66 to permit the withdrawal of axle pin 66 and therefore removal of the main drive wheels 54 and 56 from bushing 64.

As an example of one embodiment of the invention, a lightweight wheelchair was constructed in which the seat had a base constructed of a honeycomb core covered by a carbon-fiber composite skin. This base had approximate dimensions of 13×18×3 in (33×45×8 cm). The back of the seat was similarly constructed and had approximate dimensions of 13×16×0.75 in (33×40×2 cm). A pair of drive wheels each having a diameter of 24 in (61 cm) was provided and were releasably mounted upon an axle at the bottom of the seat base approximately 2 in (5 cm) from its rear edge. The front end support derived from a pair of V-shaped strut members, which had legs measured about 8 in (20 cm) and 12 in (30 cm), respectively. The two strut members extended about 4 in (10 cm) in front of the wheelchair and about 7 in (18 cm) below its seat base to align their respective front end portions. A 5 in (13 cm) caster wheel was provided for the front end support of the wheelchair. This caster wheel was releasably attached to the front end portions of the strut members by a quick release mechanism. Extending from the front end portion of the strut member was a footrest and heel supports having adjustable length. The wheelchair had a total weight of approximately 16 lbs (7.3 kg), which is only two-thirds the normal weight of previously known "ultra light" wheelchairs.

I claim:

1. A lightweight foldable wheelchair comprising:
   a. a seat having a base and a back hingedly attached thereto;
   b. a pair of large wheels each demountably attached at an end of an axle member disposed at the rear portion of said base of said seat and to the rear of the center of gravity of the chair;
   c. a first strut having its rearward end hingedly mounted to the underside forward portion of said base of said seat; and
   d. a second strut having its rearward end hingedly mounted to the underside of said base of said seat rearwardly of said first strut and forward of said axle member, the forward ends of said struts abutting vertically below and forward of said seat and securing a demountable wheeled caster disposed below said forward ends of said struts and a hingedly mounted footrest;

said seat, struts and footrest being foldable into a compact portable configuration following demounting of said large wheels and said caster.

2. A wheelchair as defined in claim 1 in which said back and said seat base are contoured to conform to the human body.

3. A wheelchair as defined in claim 2 wherein said base has upraised edges on the periphery of the rear portion and opposite sides if the centerline of said seat.

4. A wheelchair as defined in claim 1 in which said back and said seat base are disposed at an angle to each which angle is substantially equivalent to the normal seat-to-back angle of a chair.

5. A wheelchair as defined in claim 1 in which said back is supported in its upright position by stops disposed at its lower portion and acting against the rearward portion of said base.

6. A wheelchair as defined in claim 1 in which each of said large wheels is demountably attached to said axle by quick release means within the hub of said wheel.

7. A wheelchair as defined in claim 1 in which each strut has a V-shape, the upper ends of said V attached to the underside of said base on opposite sides of the medial centerline of said seat.

8. A wheelchair as defined in claim 7 in which said first strut is smaller in size than said second strut such that in the folded configuration, said first strut nests within said second strut underneath said seat.

9. A wheelchair as defined in claim 1 wherein said forward ends of said struts have holes therethrough and means for aligning said holes axially.

10. A wheelchair as defined in claim 9 in which said caster comprises a single wheel rotatably attached to a fork having a upraised post.

11. A wheelchair as defined in claim 10 wherein said caster is demountably secured to said forward ends of said struts by said post fitting within said aligned holes.

12. A wheelchair as defined in claim 1 wherein said caster is disposed on the medial centerline of said wheelchair.

13. A wheelchair as defined in claim 1 in which said footrest comprises a leg, a bracket extending from said leg on either side at its forward portion and a pair of heel supports attached to said bracket.

14. A wheelchair as defined in claim 13 wherein said leg is adjustable in length.

15. A wheelchair as defined in claim further comprising means to retain said seat, struts and footrest in said folded compact configuration.

16. A wheelchair as defined in claim 15 further comprising means to retain said seat back and base folded into a parallel configuration.

17. A wheelchair as defined in claim 1 wherein said seat is formed of a lightweight high strength material.

18. A wheelchair as defined in claim 17 wherein said material comprises a fiber/polymer composite facing over a honeycomb or foam core.

19. A wheelchair as defined in claim 18 wherein said material comprises a carbon fiber/polymer composite facing over a honeycomb or foam core.

20. A wheelchair as defined in claim 1 wherein said struts are formed at least in part of lightweight material.

21. A wheelchair as defined in claim 20 wherein said struts and are formed at least in part of carbon fiber composite tubing.

* * * * *

UNITED STATES PATENT AND TRADEMARK OFFICE
CERTIFICATE OF CORRECTION

PATENT NO. : 4,887,826

DATED : December 19, 1989

INVENTOR(S) : Richard D. Kantner

It is certified that error appears in the above-identified patent and that said Letters Patent is hereby corrected as shown below:

Column 10, claim 15, line 1, "claim further" should be --claim 1 further--;

Signed and Sealed this

Nineteenth Day of March, 1991

Attest:

HARRY F. MANBECK, JR.

*Attesting Officer*

*Commissioner of Patents and Trademarks*